Dec. 16, 1969　　　R. W. ANDERSON　　　3,484,532
ELECTRICAL CONDUCTOR WITH LIGHT-WEIGHT ELECTRICAL SHIELD
Filed Oct. 18, 1966　　　2 Sheets-Sheet 1

INVENTOR
ROBERT WARREN ANDERSON

BY Cushman, Darby & Cushman
ATTORNEYS

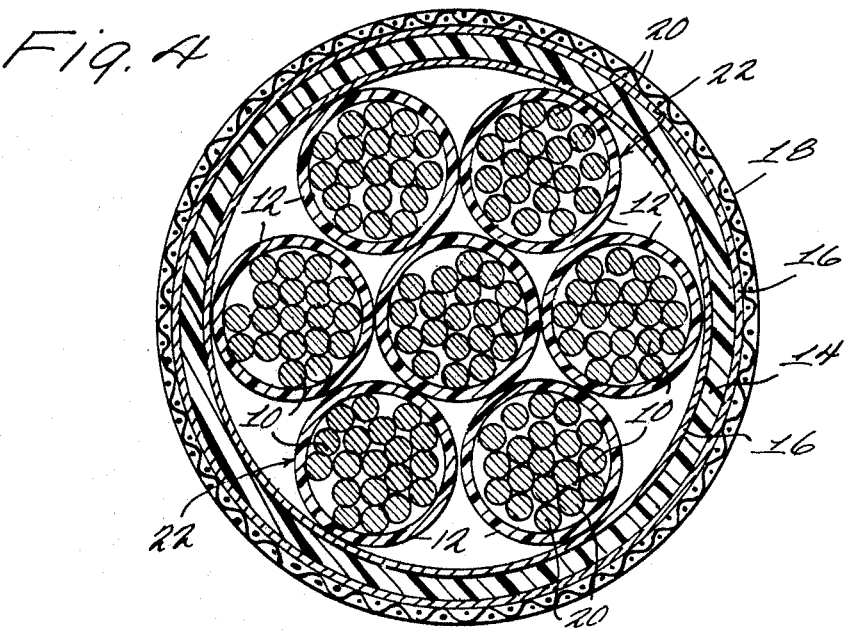
Fig. 4
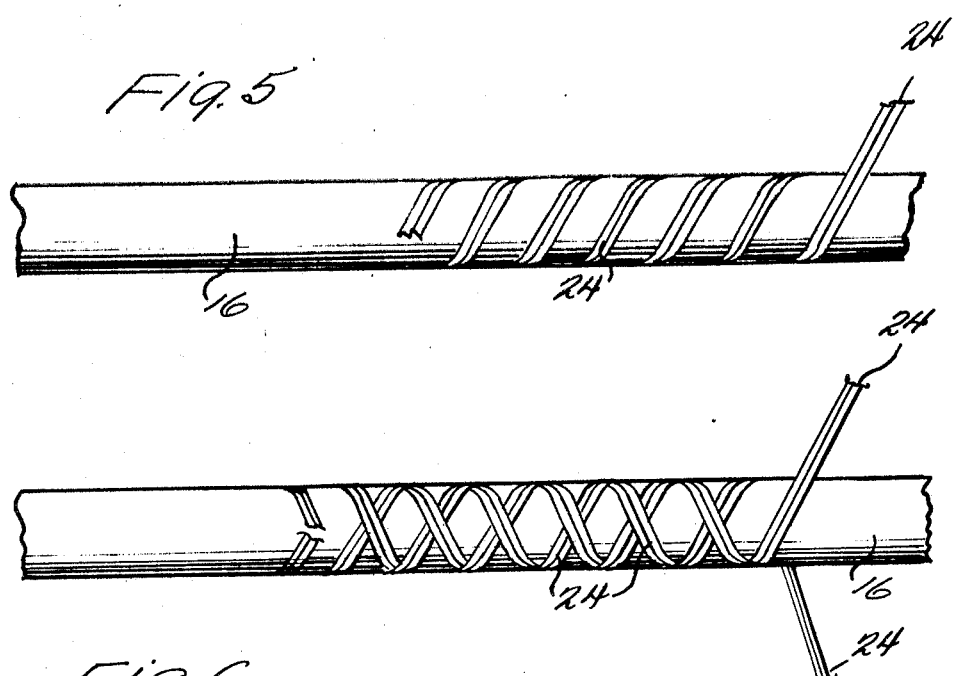
Fig. 5
Fig. 6
INVENTOR
ROBERT WARREN ANDERSON
BY
Cushman, Darby & Cushman
ATTORNEYS

United States Patent Office 3,484,532
Patented Dec. 16, 1969

3,484,532
ELECTRICAL CONDUCTOR WITH LIGHT-WEIGHT ELECTRICAL SHIELD
Robert W. Anderson, Burlington, Vt., assignor to Haveg Industries Inc., Wilmington, Del., a corporation of Delaware
Filed Oct. 18, 1966, Ser. No. 587,534
Int. Cl. H01b 17/06
U.S. Cl. 174—36      9 Claims

ABSTRACT OF THE DISCLOSURE

A light-weight insulated conductor comprising at least one electrical conductor having a layer of insulating material thereon. Superimposed on the insulation layer is an electrical shield member made of a dielectric organic polymeric film which has adhered on both surfaces thereof a thin electrically conductive continuous metallic film. Superimposed over the layer of dielectric organic polymeric film is a support means such as a metallic casing which covers and engages only a minor portion of the metallic film.

---

This invention relates to the production of insulated conductors and particularly to the production of insulated conductors exhibiting good mechanical strength and a substantial decrease in the overall weight of the finished product.

A prime consideration in the manufacture of insulated conductors is its total weight since many applications of the material are necessarily restricted by this factor. Efforts have been made to reduce the overall weight of the insulated conductor by providing thinner insulating coatings, by reducing the thickness of the support casings and by introducing less dense material into the construction of the conductor. However, it has been found, generally, that these measures often result in a conductor exhibiting inferior electrical properties and thus the advantage sought to be achieved are offset by other and equally serious disadvantages.

It has now been found that a relatively light-weight insulated conductor can be produced which exhibits highly favorable electrical properties and which exhibits about a 30%–70% reduction in weight heretofore required for electrical shield members thereby effecting a significant reduction in the overall weight of conventional conductors of comparable rating. Accordingly, a principal object of the instant invention is to produce such a light-weight conductor and this object is realized by providing at least one electrical conductor with an insulation layer therefor, superimposing on said insulation layer an electrical shield member comprising a layer of dielectric organic polymeric film, said layer having adhered on both surfaces thereof a thin electrically conductive continuous metallic film and superimposing over said layer of dielectric organic polymeric film, a support means such as a metallic casing which covers and engages only a minor portion of the metallic film.

The nature and objects of the invention will be better understood from a description of certain particular illustrative embodiments thereof, and for purposes of such description reference should be had to the accompanying drawings forming a part hereof, and in which:

FIGURE 4 is a sectional view of another embodiment of the instant invention showing a plurality of assembly strands, each strand of which may be insulated or uninsulated, with each assembly being insulated according to the instant invention and utilized with the shield member of the invention;

FIGURE 5 is a view of a length of a conductor made in accordance with another embodiment of the invention with the support jacket consisting of a metallic member helically wound in one direction; and FIGURE 6 is a view of a length of a conductor of the invention with the support jacket consisting of a metallic member helically wound in a plurality of directions.

Figure 1:
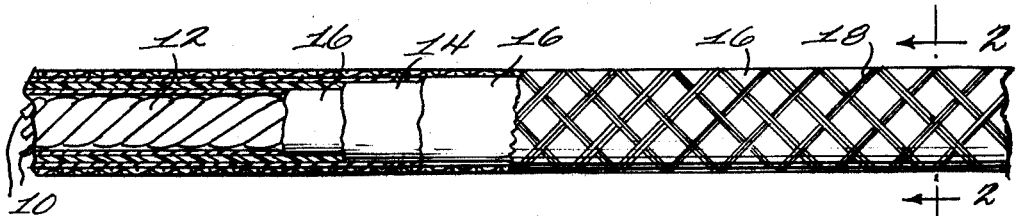
FIGURE 1 is a view of a length of a conductor made in accordance with the instant invention with parts broken away.
Figure 2:
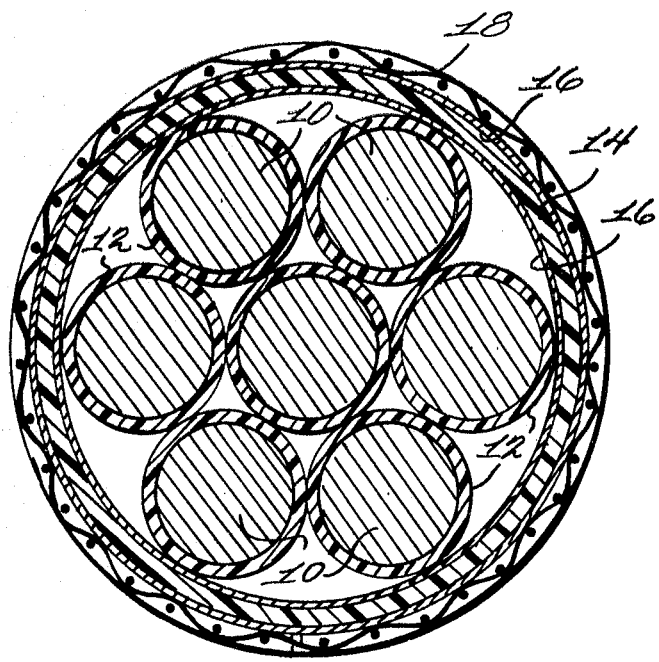
FIGURE 2 is a sectional view taken on the line 2—2 of FIGURE 1.
Figure 3:
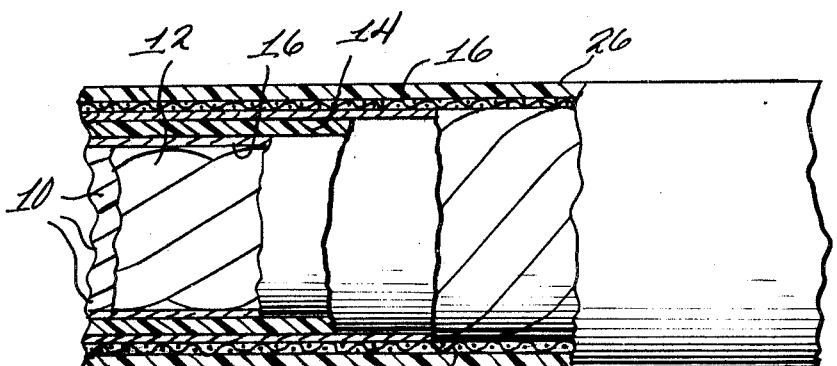
FIGURE 3 is an enlarged fragmentary view with parts broken away of a length of the conductor made in accordance with the instant invention.

Referring to the drawings, a conductor 10 is provided with an overlying insulation layer 12 which is, preferably, a sintered polymer coating such as polytetrafluoroethylene. The conductor 10 can be any electrically conductive wire material such as copper, silver, steel, aluminum, nickel or alloys thereof. Conveniently the conductive wire has an American Gage Wire number ranging preferably from about 36 to 0. The insulating layer 12 preferably has a thickness of about 6 mils although layers as thin as 2 mils and as thick as 100 mils can also be employed. The conductor 10 can be coated with polytetrafluoroethylene in any convenient manner. For instance, the wire can be passed through an aqueous suspension of polytetrafluoroethylene with excess suspension being removed. Thereafter, water can be removed from the wet coating by air drying the same. Subsequently the air-dried coating can be heated to a temperature of about 750° F. to sinter the polymer. While polytetrafluoroethylene is preferred, other materials can also be used as the insulating layer. Thus, favorable results have been achieved using polyimides, polyvinyl chloride, Isonel, varnish and the like.

Superimposed over the insulated conductor, as an electrical shield, is a layer of dielectric organic polymeric film 14, said layer having adhered on both surfaces thereof a thin electrically conductive continuous metallic film 16. Preferably the organic polymeric film 14 comprises a polyimide which can be prepared by reacting at least one organic diamine with at least one tetracarboxylic acid dianhydride. Suitable diamines include meta-phenylene diamine, para phenylene diamine, 4,4'-diamino-diphenyl propane, 4,4'-diamino-diphenyl methane, benzidine, 4,4'-diamino-diphenyl sulfide, 4,4'-diamino-diphenyl sulfone, 3,3'-diamino-diphenyl sulfone, 4,4'-diamino-diphenyl ether, 1,5-diamino-naphthalene, 3,3'-dimethoxy benzidine, 3,3'-dimethyl-4,4'-diamino-biphenyl, 2,4-bis-(beta-amino-t-butyl-phenyl)ether, para-bis(2-methyl-4-amino-pentyl)benzene, para-bis(1,1-dimethyl - 5 - amino-pentyl)benzene, 1-isopropyl-2,4-metaphenylene diamine, m-xylylene diamine, p-xylylene diamine, bis(para-aminocyclohexyl)methane, hexamethylene diamine, heptamethylene diamine, heptamethylene diamine, octamethylene diamine, nonamethylene diamine, decamethylene diamine, diaminopropyl tetramethylene diamine, 3-methylheptamethylene diamine, 4,4-dimethylheptamethylene diamine, 2,11-diaminododecane, 1,2-bis-(3-amino-propoxy ethane), 2,2-dimethylpropylene diamine, 3-methoxyhexamethylene diamine, 2,5-dimethylhexamethylene diamine, 2,5-dimethylheptamethylene diamine, 3-methylheptamethylene diamine, 5-methyl-nonamethylene diamine, 2,17-diamino-eicosadecane, 1,4-diamino-cyclohexane, 1,10-diamino-1,10-dimethyl decane, 1,12-diamino-octadecane.

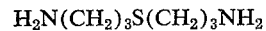

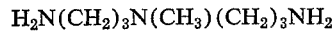

piperazine, 2,6-diamino pyridine, bis(4-amino phenyl) diethylsilane, bis-(4-amino phenyl)phosphine oxide, bis-(4-amino phenyl)-N-methylamine, 2,5-diamino-1,3,4-oxadiazole, 4,4'-diamino-diphenyl diethylsilane, 4,4'-diamino diphenyl ethyl phosphine oxide, 4,4'-diamino diphenyl phenyl phosphine oxide, 4,4'-diamino diphenyl N-methyl amine, 4,4'-diamino diphenyl N-phenyl amine and mixtures thereof.

Representative tetracarboxylic acid dianhydrides include pyromellitic dianhydride, 2,3,6,7-naphthalene tetracarboxylic dianhydride, 3,3'4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl)propane dianhydride, bis(3,4-dicarboxyphenyl)sulfone dianhydride, 3,4,9,10-perylene tetracarboxylic acid dianhydride, bis(3,4-dicarboxyphenyl)ether dianhydride, 2,2-bis(2,3-decarboxyphenyl) propane dianhydride, 1,1-bis (2,3-dicarboxyphenyl) ethane dianhydride, 1,1-bis(3,4-dicarboxyphenyl)ethane dianhydride, bis(2,3-dicarboxyphenyl)methane dianhydride, bis(3,4 - dicarboxyphenyl)methane dianhydride, ethylene tetracarboxylic dianhydride, naphthalene-1,2,4,5-tetracarboxylic dianhydride, naphthalene-1,4,5,8-tetracarboxylic dianhydride, decahydronaphthalene-1,4,5,8-tetracarboxylic dianhydride, 4,8-dimethyl-1,2,3,5,6,7-hexahydronaphthalene - 1,2,5,6 - tetracarboxylic dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene - 1,8,9,10-tetracarboxylic dianhydride, cyclopentane-1,2,3,4-tetracarboxylic dianhydride, pyrrolidine-2,3,4,5-tetracarboxylic dianhydride, pyrazine-2,3,5,6-tetracarboxylic dianhydride, benzene - 1,2,3,4 - tetracarboxylic dianhydride, 1,2,3-butane tetracarboxylic dianhydride, thiophene-2,3,4,5-tetracarboxylic dianhydride, 3,4,3',4'-benzophenone tetracarboxylic dianhydride.

Preferably the diamine and tetracarboxylic acid dianhydride are reacted in an organic solvent in stoichiometric amounts for at least one of the reactants, the solvent being inert to the reactants, preferably under anhydrous conditions for a time and at a temperature below 175° C., preferably below 100° C., sufficient to form the corresponding polyamide-acid and having an inherent viscosity of at least 0.1, preferably 0.3–5; and then converting the resulting composition to the polyimide, the polyimide also having an inherent viscosity of at least 0.1, preferably 0.3–5. It has been found convenient to maintain the reaction mixture below 60° C. and preferably below 50° C.

Solvents useful in the solution polymerization process for synthesizing the polyamide-acid composition include N,N-dimethyl formamide, N,N-dimethyl acetamide, N,N-diethyl formamide, N,N-diethyl acetamide, N,N-dimethylmethoxy acetamide, N-methyl caprolactam, dimethylsulfoxide, N-methyl-2-pyrrolidone, tetramethyl urea, pyridine, dimethylsulfone, hexamethyl phosphoramide, tetramethylene sulfone, formamide, N-methyl formamide, butyrolactone and N-acetyl-2-pyrrolidone each alone or in combination with each other or with such solvents as benzene, benzonitrile, dioxane, xylene, toluene and cyclohexane. The quantity of organic solvent used need only be sufficient to dissolve enough of one reactant, preferably the diamine to initiate the reaction of the diamine and the dianhydride. Preferably, however, the solvent is present in amounts of at least 60% of the polymeric solution, i.e., the solution should contain 0.05–40% of the polymeric component.

The polyamide acid or a salt thereof can be formed into films by solvent casting followed by removal of the solvent. Thereafter the polyamide acid composition is treated to convert it to a polyimide. Conveniently this conversion can be accomplished by heating the polyamide acid film composition to a temperature above 50° C. Preferably the heat treatment is conducted at a temperature of about 100° C. to 325° C. for a time sufficient to complete the cyclization or polyimidification step. Generally the time required will range between 10–100 seconds or as long as several hours. It will be recognized that the temperature and time employed will depend on the particular polyamide acid treated as well as the form of the acid, i.e. as a salt thereof. Additionally the heating step, if desired, can be conducted in a stream of an inert gas such as nitrogen and the heating application can be carried out step wise.

The polyamide acid can also be converted by treating it with a dehydrating agent such as acetic anhydride, propionic anhydride, butyric anhydride and similar fatty acid anhydrides. A tertiary amine can also be used, if desired, in combination with the dehydrating agent. Suitable tertiary amines include pyridine, triethylamine, isoquinoline, alpha, beta or gamma picoline and 2.5-lutidine.

Subsequent to the preparation of a suitable polyimide film having a thickness up to about 0.5 mil and preferably not greater than about 0.125 mil, the film is provided on both sides thereof with a metallic surface 16 by any conventional procedure and preferably by commercial vacuum metal coating methods which provide a smooth homogeneous and continuous coating. The metal coating can be, for instance, silver, the platinum metals, particularly, rhodium, platinum and palladium, copper, gold, tin, stainless steel, aluminum, or alloys thereof. The platinum metals do not oxidize as readily as metals such as copper or aluminum and consequently are preferred over these metals. However, most shielding is effected using silver, which is preferred, since it too does not oxidize as readily as aluminum. Generally, the metal coating on each side of the polyimide film will have a thickness ranging up to 0.125 mil. Metal coatings as thin as 0.1 mil are also desirable. It will be recognized that metal coatings greater than 0.125 mil in thickness are possible but generally the excess metal does not materially increase the electrical properties of the conductor while it disadvantageously increases the total weight thereof. The metallized polyimide film preferably is spirally or helically wound around the insulated conductor or conductors. As shown in FIGURE 1 a plurality of conductors 10 are employed and in this instance the conductor assembly comprises seven wires of which six are laid up helically around a seventh to form a seven-wire strand. If desired a layer of twelve wires, each provided with an insulating coating described above can be laid up helically about the seven-wire strand thus providing a nineteen-wire strand. A thirty-seven-wire strand or forty-nine-wire strand or larger can also be provided when circumstances require strands of these sizes.

As seen in FIGURE 4, a plurality of wire strands 20, each insulated or uninsulated are assembled together, the assembly 22 then provided with an insulating layer 12 as described hereinbefore. A plurality of assemblies 22 can be concentrically arranged as described above, or arranged in any other conventional manner, the arrangement then being provided with the novel electrical shield member of this invention as described above.

A metallic braid support or retainer member 18 is placed over the one-wire or multiple-wire strand helically wound with the metallized polyimide film. The metallized polyimide film shield replaces the electrical function of a conventional metallic closed braid shield and therefore the braid 18 may be open. The open braid retainer 18 serves to hold the metallized polyimide film shield in place and also serves as a drain and need only be of a construction sufficient to serve this purpose. Thus, open mesh braid is conveniently employed and will have a weight considerably less than conventional metallic braid which has, heretofore, been employed as a shield member. The open braid construction also provides a common "pigtail" terminal connection. When used the metallic braid can be fabricated from materials such as copper or bronze. In a typical seven-conductor shielded construction it was found that the construction weighed approximately 32 lbs./1000 feet of which 8 lbs. were closed braid copper shield. The metallized polyimide film employed in the construction of this invention weighs about 0.3 lb./1000 feet. Since only about 2 lbs. of conventional copper braid material is needed for the open braid retainer 18 the combined weight of the retainer 18 and the metallized polyimide film results in a reduction of about 5½ lbs./1000 feet, i.e., about a 70% reduction in the weight of the electrical shield member or about 17% reduction of the overall weight of the conductor.

While only one layer of metallized polyimide film is shown in the drawings it will be obvious that multiple layers can be used if desired. In such an instance, the retainer or support member 18 is placed over the outermost polyimide film layer. Additionally, as shown in the embodiments represented in FIGURES 5 and 6, the support member 18 can be a metallic member or members 24 helically wound in one direction or a plurality of directions, respectively.

If the conductor is used in certain environments a conventional plastic jacket 26 can be employed and in such instances the plastic jacket material can be tape wound about the open braid 18 or secured thereon by other methods such as by extrusion techniques. Suitable plastic materials employed as the jacket 26 include polytetrafluoroethylene and fluoroethylene propylene resins.

What is claimed is:
1. An electrical conductor comprising at least one electrical conductor means provided with a layer of insulating material selected from the group consisting of polytetrafluoroethylene, and polyimide, a layer of polyimide film surrounding said layer of insulating material, said layer of polyimide having adhered on both surfaces thereof a complete covering of thin electrically conductive continuous metallic film, and metallic support means surrounding and engaging the outer metallic film adhered to said polyimide layer throughout the entire length of the conductor, said metallic support means being constructed to cover only a minor portion of said outer metallic film throughout the entire length of the conductor.
2. The conductor of claim 1 wherein said metallic film is silver.
3. The conductor of claim 1 wherein said polymeric film has a thickness up to 0.125 mil.
4. The conductor of claim 1 wherein the metallic film on each surface of said polymeric film has a thickness up to 0.125 mil.
5. The conductor of claim 1 wherein the metallic support means is an open braid support.
6. The conductor of claim 1 wherein said metallic support means is helically wound in one direction about said outer metallic film.
7. The conductor of claim 1 wherein said metallic support means is helically wound in a plurality of directions about said outer metallic film.
8. The conductor of claim 1 wherein said insulated electrical conductor means comprises a plurality of electrical conductor assemblies, each of said assemblies comprising a plurality of electrical strands.
9. The conductor of claim 1 wherein said insulated electrical conductor means is surrounded by a plurality of layers of polyimide film, each of said layers of film having adhered on both surfaces thereof a complete covering of thin electrically conductive continuous metallic film.

References Cited

UNITED STATES PATENTS

| | | | |
|---|---|---|---|
| 2,133,863 | 10/1938 | Knoderer | 174—108 X |
| 2,328,398 | 8/1943 | Rosnosky. | |
| 2,718,544 | 9/1955 | Shepp | 174—113 |
| 3,051,771 | 8/1962 | Lee | 174—36 |
| 3,303,550 | 2/1967 | Banzhof | 317—258 X |
| 3,179,634 | 4/1965 | Edwards | 174—110 |

FOREIGN PATENTS

| | | |
|---|---|---|
| 239,007 | 7/1960 | Australia. |
| 1,812 | 1859 | Great Britain. |
| 286,676 | 4/1928 | Great Britain. |
| 479,481 | 2/1938 | Great Britain. |
| 624,814 | 9/1961 | Italy. |

ELLIOTT A. GOLDBERG, Primary Examiner

U.S. Cl. X.R.

174—105, 108, 110, 113, 114